US012801808B2

(12) United States Patent
Hong et al.

(10) Patent No.: US 12,801,808 B2
(45) Date of Patent: Nov. 17, 2026

(54) FREQUENCY SELECTIVE SURFACE FILTER DESIGN METHOD, AND STORAGE MEDIUM FOR STORING COMPUTER PROGRAM

(71) Applicant: KOREA RESEARCH INSTITUTE OF STANDARDS AND SCIENCE, Daejeon (KR)

(72) Inventors: Young Pyo Hong, Sejong (KR); In Ho Lee, Daejeon (KR); In June Hwang, Paju-si (KR); Dal Jae Yun, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 980 days.

(21) Appl. No.: 17/924,585

(22) PCT Filed: May 11, 2021

(86) PCT No.: PCT/KR2021/005895
§ 371 (c)(1),
(2) Date: Nov. 10, 2022

(87) PCT Pub. No.: WO2021/230628
PCT Pub. Date: Nov. 18, 2021

(65) Prior Publication Data

US 2023/0229829 A1 Jul. 20, 2023

(30) Foreign Application Priority Data

May 13, 2020 (KR) ........................ 10-2020-0056959

(51) Int. Cl.

| | |
|---|---|
| ***G06F 30/20*** | (2020.01) |
| ***H01P 1/20*** | (2006.01) |
| *G06F 111/06* | (2020.01) |

(52) U.S. Cl.
CPC ................ *G06F 30/20* (2020.01); *H01P 1/20* (2013.01); *G06F 2111/06* (2020.01)

(58) Field of Classification Search
CPC .......... G06F 30/20; G06F 30/25; G06F 30/27; G06F 30/28; G06F 2111/06; H01P 1/20; H01Q 15/0013
See application file for complete search history.

(56) References Cited

U.S. PATENT DOCUMENTS

| | | | | |
|---|---|---|---|---|
| 2008/0165075 | A1 | 7/2008 | Adair et al. | |
| 2009/0125254 | A1 | 5/2009 | Kotter et al. | |
| 2010/0201465 | A1 * | 8/2010 | McKinzie, III ...... | H05K 1/0236 174/250 |

FOREIGN PATENT DOCUMENTS

| | | | |
|---|---|---|---|
| JP | 2020-072329 | A | 5/2020 |
| KR | 10-2009-0030342 | A | 3/2009 |

OTHER PUBLICATIONS

Al-Joumayly, Mudar A., and Nader Behdad. "Low-profile, highly-selective, dual-band frequency selective surfaces with closely spaced bands of operation." IEEE Transactions on Antennas and Propagation 58.12 (2010): 4042-4050. (Year: 2010).*

(Continued)

*Primary Examiner* — Michael Edward Cocchi
(74) *Attorney, Agent, or Firm* — Paratus Law Group, PLLC

(57) ABSTRACT

A method of designing a frequency selective surface (FSS) filter, includes: calculating a candidate solution corresponding to a structure of the FSS filter and an objective-function value corresponding to a difference between a frequency response resulting from the candidate solution and a targeted frequency response; modifying the candidate solution into a trial solution in accordance with a genetic algorithm; and (Continued)

calculating an objective-function value with the trial solution to determine whether to include the trial solution in candidate solutions.

29 Claims, 11 Drawing Sheets

(56) References Cited

OTHER PUBLICATIONS

Ohira, Masataka, et al. "Multiband single-layer frequency selective surface designed by combination of genetic algorithm and geometry-refinement technique." IEEE transactions on antennas and propagation 52.11 (2004): 2925-2931. (Year: 2004).*
Ahmad, Sabbir U. Design of digital filters using genetic algorithms. Diss. 2008. (Year: 2008).*
Bayraktar, Zikri. "Novel meta-surface design synthesis via nature-inspired optimization algorithms." (2011). (Year: 2011).*
Hamming, Richard W. "Error detecting and error correcting codes." The Bell system technical journal 29.2 (1950): 147-160. (Year: 1950).*
Aguilar, Nikolas N., et al. "A multiobjective perspective for the design of frequency selective surfaces." (2019). (Year: 2019).*
International Search Report for PCT/KR2021/005895 mailed Aug. 26, 2021 from Korean Intellectual Property Office.
D.G. Holtby et al., "Geometric transition radar absorbing material loaded with a binary frequency selective surface", IET Radar Sonar Navig., 2011, pp. 483-488, vol. 5. No. 4.

* cited by examiner (a)

(b)

(a)

(b)

FREQUENCY SELECTIVE SURFACE FILTER DESIGN METHOD, AND STORAGE MEDIUM FOR STORING COMPUTER PROGRAM

CROSS-REFERENCE TO PRIOR APPLICATIONS

This application is a National Stage Patent Application of PCT International Patent Application No. PCT/KR2021/005895 (filed on May 11, 2021) under 35 U.S.C. § 371, which claims priority to Korean Patent Application No. 10-2020-0056959 (filed on May 13, 2020), which are all hereby incorporated by reference in their entirety.

BACKGROUND

The present technology relates to a frequency selective surface (FSS) filter design method and a storage medium for storing computer software for performing the FSS filter design method.

A frequency used for wireless communication varies depending on a wireless communication provider. Base stations require a filter to separate a wireless communication frequency band used by each wireless communication provider and avoid interference which may result from various causes. The filter functions to separate frequency bands from each other in this way.

A frequency selective surface (FSS) is a curved or flat three-dimensional (3D) surface having an artificially manufactured thickness to selectively transmit or block a frequency wave wanted by a user. Such a frequency selective property of an FSS can be obtained by arranging conductors or apertures as pixels.

The frequency response characteristics of an FSS filter vary depending on not only the geometric shape of a structure selected as unit cells but also the shape of a pixel arrangement in the unit cells and material properties of a dielectric and a conductor used as a substrate supporting the unit cells. Accordingly, various methods of obtaining frequency characteristics wanted by a user have been researched and proposed.

A genetic algorithm is an algorithm fundamentally based on the theory of biogenetics in nature, and is based on Darwin's theory of survival of the fittest. A genetic algorithm expresses possible solutions to a problem to be solved in a determined form of data structure and then gradually modifying the solutions, thereby creating better solutions. Here, the data structure representing solutions may be expressed genes, and a process of creating better solutions by modifying the genes may be expressed as evolution.

Such a genetic algorithm may include crossovers and mutations. In a crossover operation, generally, a plurality of solutions are selected, and then a crossing operation is performed between the plurality of solutions. As solutions generated in this way, new genes are constructed by receiving genetic factors from positions that do not overlap each other through a crossover operation of parent solutions. A mutation operation is an operation in which the order or values of genetic factors in a given solution are arbitrarily changed and transformed into another solution.

SUMMARY

Conventionally, frequency selective surface (FSS) filter unit cells are completed by changing a known arrangement of unit cells. Frequency characteristics in accordance with such a change in the pixel arrangement are examined to design an FSS filter. Designing an FSS filter to have a targeted frequency response often requires a high degree of expertise. Accordingly, it takes a long time to design a filter having a desired frequency response by repeating a process of adjusting the arrangement of unit cells one by one, finding frequency characteristics, and then changing the arrangement of unit cells again for the desired frequency response. Also, filter design is so difficult that it is practically impossible to implement perfect performance. Although it is possible to propose various frequency response characteristics in theory, it is practically difficult to implement the frequency response characteristics due to the combinatorial possibilities of countless arrays that are not listable.

The present invention is directed to providing a method of designing an FSS filter to have a targeted frequency response characteristic using an efficient global optimization algorithm.

One aspect of the present invention provides a method of designing a frequency selective surface (FSS) filter, the method including calculating a candidate solution corresponding to a structure of the FSS filter and an objective-function value corresponding to a difference between a frequency response resulting from the candidate solution and a targeted frequency response, modifying the candidate solution into a trial solution in accordance with a genetic algorithm, and calculating an objective-function value with the trial solution to determine whether to effectively include the trial solution in candidate solutions.

Another aspect of the present invention provides a computer program including calculating a candidate solution corresponding to a structure of an FSS filter and an objective-function value corresponding to a difference between a frequency response resulting from the candidate solution and a targeted frequency response, modifying the candidate solution into a trial solution in accordance with a genetic algorithm, and calculating an objective-function value with the trial solution to determine whether to effectively include the trial solution in candidate solutions. The present embodiment completes the design of an FSS filter and outputs patterns of all calculated frequency selection filters and frequency response characteristics each corresponding to the frequency selection filters.

According to the present embodiment, it is possible to design a frequency selective surface (FSS) filter that has a targeted general frequency response by performing generation of combinatorial patterns, which is practically almost impossible according to the conventional art, through computation in a very efficient way.

DETAILED DESCRIPTION

Hereinafter, a method of designing a frequency selective surface (FSS) filter according to the present embodiment will be described with reference to the accompanying drawings. In the following description, the shape of pixels is described as a square. However, a very large number of pixels are used in a design, and thus it is possible to express a pattern having a general response characteristic.

Figure 1:
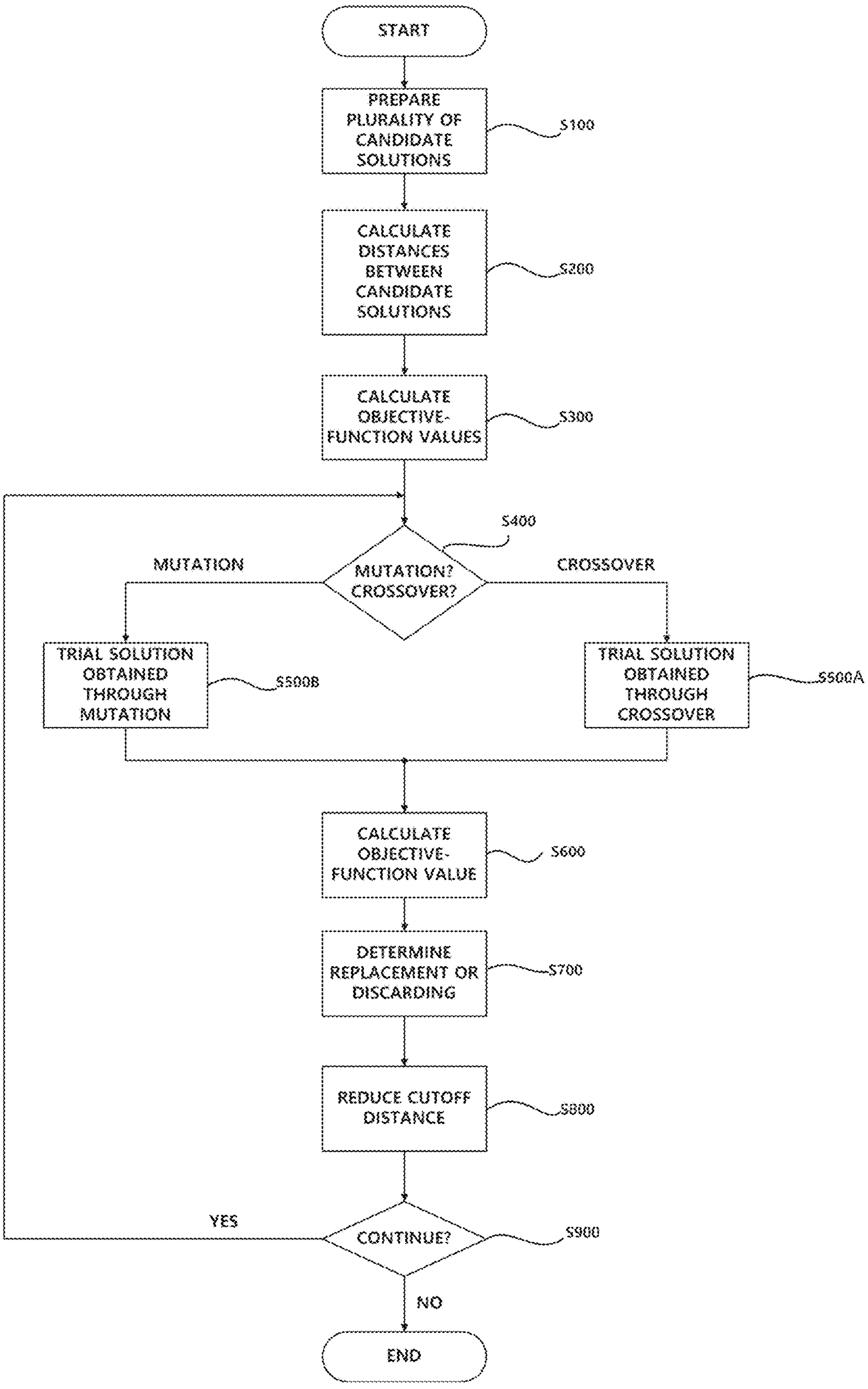
FIG. 1 is a flowchart illustrating an overview of a method of designing a frequency selective surface (FSS) filter according to the present embodiment.

FIG. 1 is a flowchart illustrating an overview of a method of designing an FSS filter 10 according to the present embodiment. Referring to FIG. 1, the method of designing the FSS filter 10 according to the present embodiment may include an operation S100 of preparing for multiple candidate solutions, an operation S200 of calculating the distances between the candidate solutions, an operation S300 of calculating objective-function values of the candidate solutions, an operation S400 of selecting mutation or crossover in a genetic algorithm, an operation S500A of generating a crossover trial solution when crossover is selected, an operation S500B of generating a mutation trial solution when mutation is selected, an operation S600 of calculating a local minimization value and an objective-function value of each trial solution, an operation S700 of determining whether to use or discard the trial solution in accordance with the objective-function value, an operation S800 of reducing a cutoff distance, and an operation S900 of determining whether to continuously perform the process. For example, the cutoff distance is used as a criterion for assessing how different the shape of an obtained trial solution is from existing candidate solutions.

Figure 2:
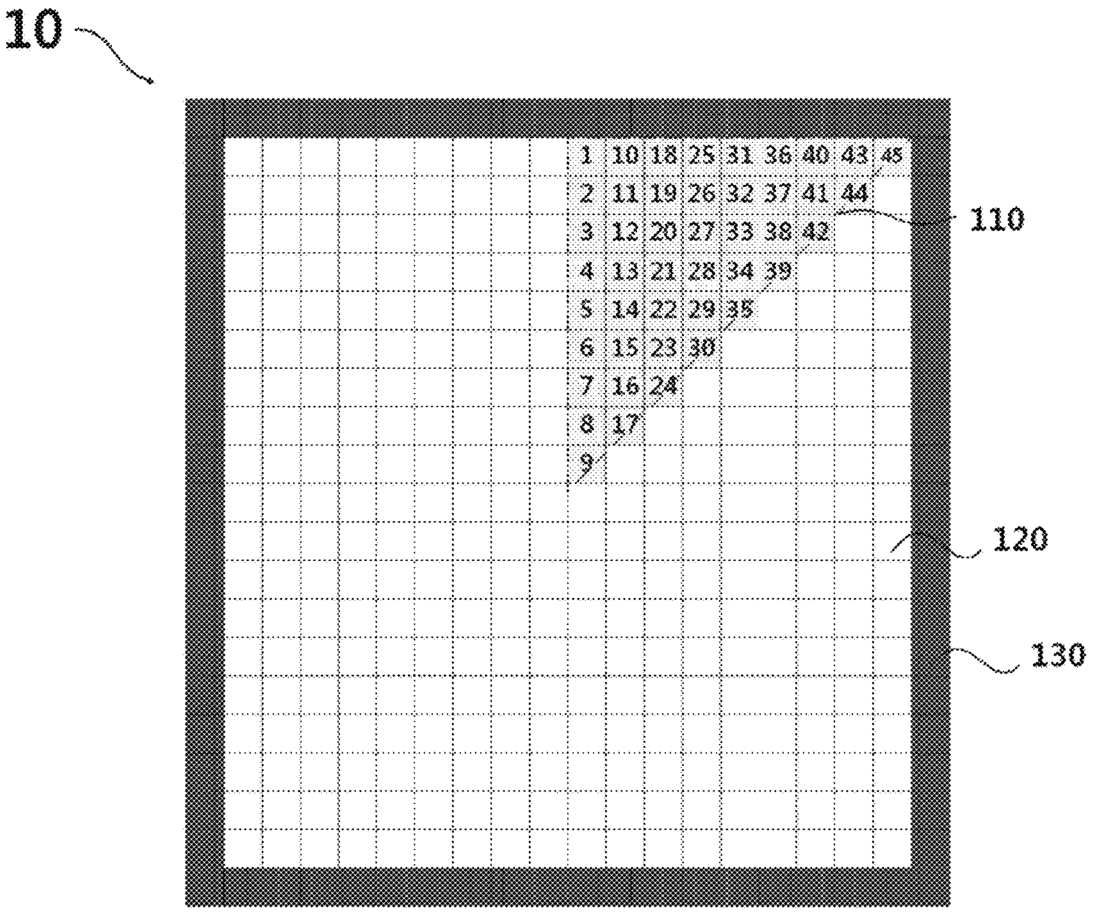
FIG. 2, (a) is a plan view schematically showing an FSS filter according to the present embodiment and FIG. 2, (b) is a schematic cross-sectional view of the FSS filter.
Figure 2:
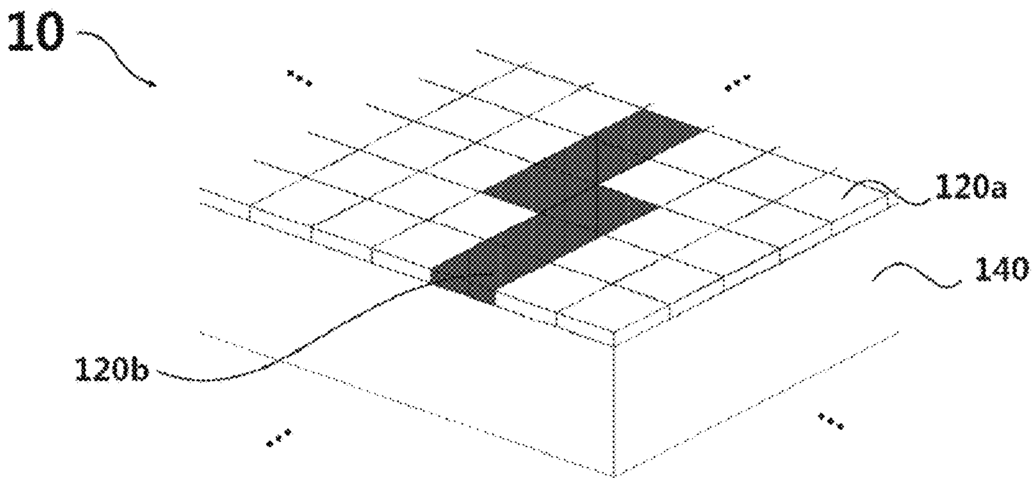

FIG. 2, (a) is a plan view of schematically showing the FSS filter 10 according to the present embodiment, and FIG. 2, (b) is a schematic cross-sectional view of a part of the FSS filter. Referring to FIG. 2, (a) and (b), the FSS filter 10 according to the present embodiment may include multiple unit cells, and the unit cells 120 may include, for example, pixels 120*b* filled with a metal film and vacant pixels 120*a*. Under the metal film, a dielectric layer 140 may be present.

A frequency selective property of the FSS filter 10 may vary depending on the shape of unit cells 120 filled with the metal. In the example shown in the drawings, 20 square pixels 120 may be disposed horizontally, and 20 square pixels 120 may be disposed vertically so that the FSS filter 10 is formed. However, this is only an example, and the number and shape of pixels 120 and a shape formed by the pixels 120 may vary.

An edge 130 of the FSS filter 10 may be filled with a metal. The FSS filter 10 is assumed to have finite periodicity. Accordingly, the FSS filter 10 may be filled with a metal and covered with the edge 130 to obtain finite periodicity required by the FSS filter 10. In the example shown in FIG. 2, unit cells 130 of the edge are not included in an irreducible zone and remain filled with a conductor.

An irreducible zone 110 is extracted from the surface of the FSS filter 10. The irreducible zone 110 may be a unit that may cover the entire surface of the FSS filter unit cells 10 using symmetry. An example of the irreducible zone 110 is shown in FIG. 2, (a). As illustrated, unit cells belonging to the irreducible zone 110 may be indicated by 1 to 9, 10 to 17, 18 to 24, 25 to 30, 31 to 35, 36 to 39, 40 to 42, 43 and 44, and 45 in a zigzag manner. However, this is merely an example for distinguishing pixels 120 of the irreducible zone 110 and is not intended to limit the scope of the invention by limiting a method of referring to pixels in the irreducible zone.

As described above, a state of pixels in the irreducible zone 110 may be referred to as a one-dimensional (1D) sequence, and any one pixel 120 in the irreducible zone 110 may be expressed as one digit in the sequence. Such expression make it possible to process crossover and mutation operations simply.

It is required for an FSS filter to have rotational symmetry. This is because electromagnetic waves may be incident on the installed filter at various angles. To ensure the same filter performance for various angles of incidence, it is necessary to design unit cells with rotational symmetry. An irreducible zone is introduced in consideration of such a physical condition. Accordingly, when an irreducible zone is determined through a combinatorial optimization process, a filter shape having rotational symmetry may be determined. The irreducible zone expressed in the form of a 1D arrangement as described above is expanded to the entire surface of the FSS filter 10 using symmetry required by FSS filters.

Referring to FIGS. 1 and 2, according to an embodiment, a target frequency response, which is a frequency response to be implemented by the FSS filter 10, is set. The target frequency response may determine a passband frequency (Hz), a cutoff frequency (Hz), a signal strength (dB) of a passband, a signal strength (dB) of a cutoff band, etc. to be obtained by the FSS filter 10 (see FIG. 4).

Multiple candidate solutions are prepared (S100). Random numbers may be assigned to digits included in a sequence expressing a candidate solution. As described above, the candidate solutions correspond to the irreducible zone 110, and each digit included in the candidate solutions may correspond to a pixel included in the irreducible zone 110.

A value of 0 or 1 may be assigned to each digit included in the candidate solutions in accordance with a sequence number. As an example, "0" may correspond to a pixel 120*a* not filled with the metal film in the irreducible zone 110, and "1" may correspond to a pixel 120*b* filled with the metal film in the irreducible zone 110. Also, multiple (e.g., 20) candidate solutions are prepared. A set of multiple candidate solutions is referred to as a candidate solution group.

Figure 3:
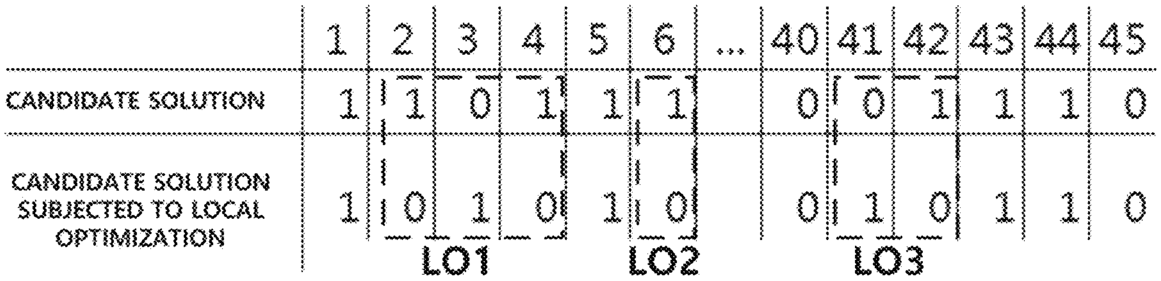
FIG. 3 is a diagram showing examples of performing local optimization.

According to an embodiment, local optimization is performed on the prepared candidate solutions. FIG. 3 is a diagram showing examples of performing local optimization. Referring to FIG. 3, when local optimization is performed, values assigned to some digits of a candidate solution generated as random numbers are changed. An objective-function value of a trial solution obtained with the change through the local optimization process is observed. When the objective-function value is smaller than an existing value, the trial solution is updated. When the objective-function value is larger than the existing value, the trial solution is not updated. When this process is repeated, it is possible to obtain an updated trial solution having a smaller objective-function value. In other words, it is possible to change information on pixels assigned to unit cells. When the candidate solution undergoes the local optimization process, the corresponding objective-function value may become smaller. According to an embodiment, local optimization may be performed on a plurality of digits as indicated by LO1 and LO3 and may also be applied to a single digit as indicated by LO2.

The position and the number of digits on which local optimization is performed may be determined by a random number. Accordingly, the number of digits subjected to local optimization in any one candidate solution may differ from the number of digits subjected to local optimization in another candidate solution, and positions at which local optimization is performed may also be different.

In the embodiment illustrated in FIG. 3, local optimization is performed on the candidate solution so that the candidate solution becomes a new candidate solution. The optimization process is completed only when 0 or 1 is determined for every pixel in an irreducible zone. That is, when there are 45 pixels, 0 or 1 may be assigned to each of the 45 pixels. In other words, a global optimization process is performed in a space corresponding to $2^{45}$. This becomes the number of independent variables to be determined in an optimization problem. The number of pixels is the size of a space in which candidate solutions to be optimized are searched for. The local optimization process may be performed in the following processes (e.g., S500A and S500B) in a similar way to variously change candidate solutions and/or trial solutions.

Referring back to FIGS. 1 and 2, the distances between the candidate solutions are calculated (S200). The distance is calculated by comparing any one candidate solution with another candidate solution digit by digit, assigning a value of 0 to a digit which is the same as a corresponding digit in the other candidate solution, assigning a value of 1 to a digit which differs from a corresponding digit in the other candidate solution, and summing the values. In other words, the distance between candidate solutions is the same as the Hamming distance between the candidate solutions.

When the distance between a first candidate solution and a second candidate solution is 10, 10 digits are different between the first and second candidate solutions. The distance between candidate solutions may also be the difference (similarity) between the candidate solutions.

According to an embodiment, a cutoff distance is set. For example, the cutoff distance may be set to half the average of the calculated distances between the candidate solutions. However, the set cutoff distance may be adjusted in a subsequent process (S900). For example, the cutoff distance may be adjusted to decrease by a factor of 0.97 for each attempt of crossover or mutation.

Figure 4:
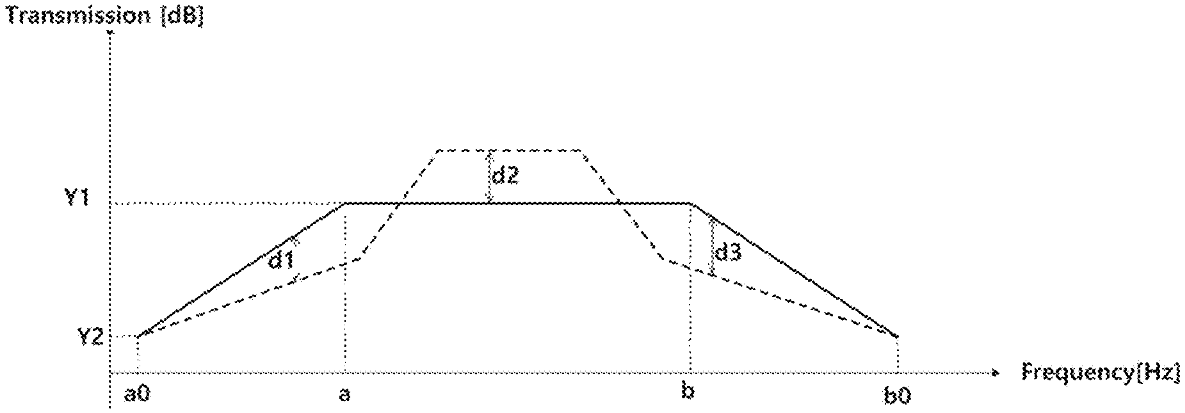
FIG. 4 is a graph illustrating an operation of calculating an objective-function value.

Objective-function values of the candidate solutions are calculated (S300). FIG. 4 is a schematic graph illustrating an operation of calculating an objective-function value. In FIG. 4, a solid line indicates a target frequency response that is initially provided and fixed, and a broken line indicates a frequency response of an FSS filter formed in accordance with any one candidate solution. Referring to FIGS. 1, 2, and 4, an objective function is calculated from a numerical difference between the target frequency response and the frequency response of the FSS filter formed in accordance with the candidate solution. The target frequency response may include information including break frequencies a and b of a passband, cutoff zone frequencies $a_0$ and $b_0$, a passband signal strength Y1, and a cutoff band signal strength Y2.

In FIG. 4, d1, d2, and d3 represent the differences between the target frequency response and the frequency response of the filter formed in accordance with the candidate solution. The objective function may be, for example, a function for squaring the difference between a target function corresponding to the preset target frequency response and a frequency response characteristic function calculated from the candidate solution all over the frequency section and summing the results. As another example, the objective function may be a function for calculating absolute values of the differences d1, d2, and d3 and summing the results. When the objective function is calculated in this way, it is possible to prevent the difference values from canceling each other due to the signs of the frequency response differences d1, d2, and d3.

According to an embodiment, the objective function is a numerical function designated and fixed by a user for a frequency response characteristic wanted by the user. Accordingly, a frequency response function corresponding to any objective filter, such as a bandpass filter, a band-stop filter, a multiband filter, etc., may be set as the objective function. A general objective function may be defined as a function of frequency.

In the embodiment illustrated in FIG. 4, an amplitude of the target frequency response is compared with a frequency response amplitude of the filter formed in accordance with the candidate solution simply at three frequencies, but this is just a schematic example. The objective function compares an amplitude of the target frequency response with a frequency response amplitude of the filter formed in accordance with the candidate solution at intervals of 1 kHz to 100 MHz. When an objective-function value is calculated for each of the multiple candidate solutions, it is possible to find the similarity of each candidate solution with the target frequency response. According to an embodiment, the candidate solutions may be sorted and stored in increasing order of the objective-function value.

Subsequently, the candidate solutions are genetically transformed using a genetic algorithm (S400). According to an embodiment, the candidate solutions may be genetically transformed by performing crossover on any two or more candidate solutions to generate a crossover trial solution or performing mutation on any one or more candidate solutions to generate a mutation trial solution (S500B).

According to an embodiment, whether to perform crossover or mutation on the candidate solutions may be determined by a random number. For example, a random number generator (not shown) may output a value between 0 and 1, and any one of crossover and mutation may be selected depending on whether the output value is greater or smaller than a threshold value of 0.5.

Figure 5:
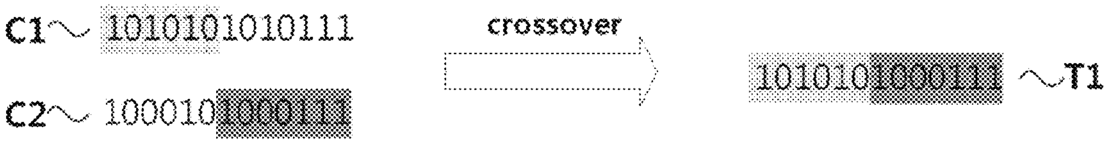
FIG. 5 is a diagram illustrating an operation of generating a crossover trial solution when crossover is selected.

The operation S500A of generating a crossover trial solution will be described with reference to FIG. 5. As an example, the embodiment illustrated in FIG. 5 shows candidate solutions C1 and C2 and a trial solution T1 which are expressed as sequences including 13 digits. FIG. 5 shows the two candidate solutions C1 and C2 selected from among multiple candidate solutions. Crossover is performed on shaded pixels in the candidate solution C1 and shaded pixels in the candidate solution C2 to generate a new trial solution T1.

As an embodiment of selecting a candidate solution, a candidate solution of which a frequency response is more similar to a target frequency response is more likely to be selected from among multiple candidate solutions. When an objective-function value is lower, a crossover or mutation operation is more likely to be performed on a corresponding candidate solution.

One of the single tournament method or the Poisson's distribution method is selected to select a candidate solution. In the single tournament method, two randomly selected different candidate solutions are selected first, and then a candidate solution having a smaller objective-function value is finally selected. In the Poisson's distribution method, when candidate solutions are sorted in increasing order of the objective-function value, a Poisson distribution function is created using an average rank and a rank deviation to finally select a candidate solution. A selected rank is probabilistically in accordance with the Poisson's distribution. The best solution has the smallest objective-function value, and the corresponding rank is the first. The positions and the number of digits on which crossover occurs are both randomly determined by the random number generator (not shown).

Figure 6:
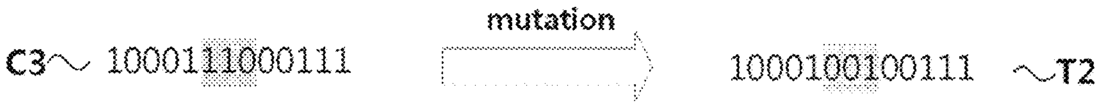
FIG. 6 is a diagram illustrating an operation of generating a mutation trial solution when mutation is selected.

The operation S500B of generating a mutation trial solution T2 will be described with reference to FIG. 6. FIG. 6 illustrates an operation of inverting values assigned to a finite number of digits in a selected candidate solution C3. Here, inverting the state of a digit means a change from 1 to 0 or from 0 to 1. The embodiment illustrated in FIG. 6 shows an example in which mutation occurs on three consecutive pixels in the candidate solution C3. The positions and the number of pixels on which mutation occurs are both randomly determined by the random number generator (not shown). Local optimization may be performed on the trial solution generated with crossover or mutation as described above. Some digits included in the trial solution are changed by the local optimization as described above. Since some digits are changed in the local optimization process as described above, the objective-function value may become smaller.

The objective-function value of the trial solution is calculated (S600). As the objective-function value is calculated, similarity is determined between the frequency response characteristic of the FSS filter 10 provided by the trial solution and a target frequency response characteristic.

Whether to discard or use the trial solution is determined (S700). According to an embodiment, a process of calculating the distances between the trial solution and the candidate solutions is performed. A closest candidate solution which is closest (most similar) to the trial solution is determined from the distance calculation results between the trial solution and the candidate solutions.

When the distance between the trial solution and the closest candidate solution is shorter than the current cutoff distance value, an objective-function value of the trial solution is compared with an objective-function value of the closest candidate solution. When the objective-function value of the trial solution is larger than the objective-function value of the closest candidate solution (i.e., when the frequency response characteristic of the closest candidate solution is more similar to the target frequency response characteristic than the frequency response characteristic of the trial solution), the trial solution is discarded.

On the other hand, when the objective-function value of the trial solution is smaller than the objective-function value of the closest candidate solution (i.e., when the frequency response characteristic of the trial solution is more similar to the target frequency response characteristic than the frequency response characteristic of the closest candidate solution), the trial solution replaces the closest candidate solution, and the existing closest candidate solution is discarded.

When the distance between the trial solution and the closest candidate solution is larger than the current cutoff distance value, the objective-function value of the trial solution is compared with an objective-function value of a candidate solution having the largest objective-function value among the existing candidate solutions (i.e., a candidate solution having a frequency response characteristic that is most dissimilar to a desired frequency response characteristic among the candidate solutions).

When the objective-function value of the trial solution is smaller than the largest objective-function value of the candidate solutions (i.e., when the frequency response characteristic of the trial solution is more similar to the target frequency response characteristic than the frequency response characteristic of the compared candidate solution), the trial solution replaces the compared candidate solution, and the compared candidate solution is discarded. On the other hand, when the objective-function value of the trial solution is larger than the largest objective-function value of the candidate solutions (i.e., when the frequency response characteristic of the compared candidate solution is more similar to the target frequency response characteristic than the frequency response characteristic of the trial solution), the trial solution is discarded.

Trial solutions are included in a group of the existing candidate solutions through this process, and among the existing candidate solutions, candidate solutions resulting in a frequency response characteristic dissimilar to the target frequency response characteristic are discarded. Accordingly, the frequency response characteristic of the FSS filter 10 formed by the candidate solutions belonging to the candidate solution group gradually approaches the target frequency response characteristic.

Global optimization is performed to reduce the cutoff distance value (S800). The cutoff distance value is a criterion for determining whether to replace a candidate solution with the trial solution. In general, different forms of trial solutions may be replaced with the candidate solution group, and thus the candidate solution group may ensure diversity. Such a replacement method ensures the diversity of candidate solutions and is a computation that is not found in existing genetic algorithms.

It is determined whether to continue the above process (S900). According to an embodiment, whether to continue the above process may be determined in accordance with a change of the objective-function value. When the objective-function value is determined not to be reduced any more and thus the frequency response characteristic sufficiently approaches the frequency response characteristic wanted by the user, a plurality of unit FSS filters 10 designed as described above may be arranged in an array to constitute an FSS filter.

Figure 7:
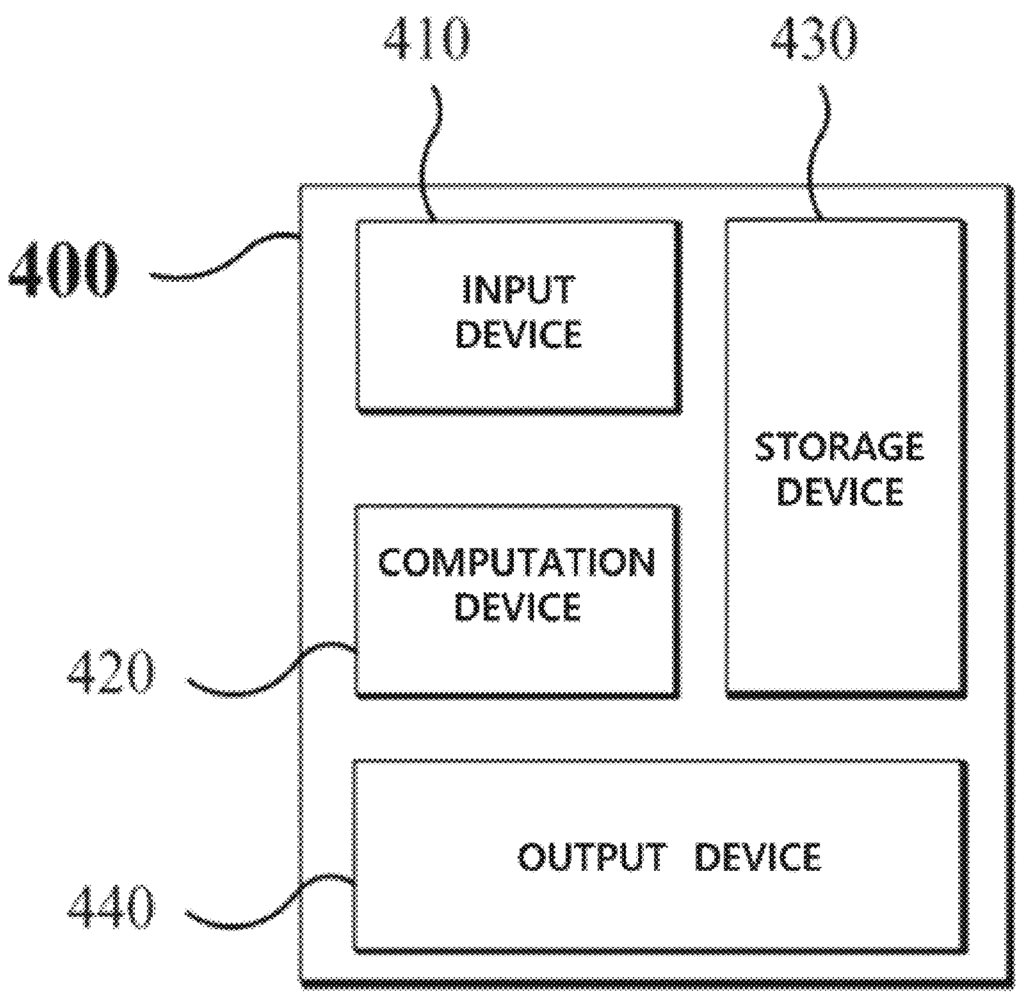
FIG. 7 is a block diagram showing an example of a device, such as a personal computer (PC) or the like, that executes software for performing a method of designing an FSS filter.

FIG. 7 is a block diagram showing an example of a device, such as a personal computer (PC) or the like, that executes software for performing a method of designing an FSS filter. The software for performing the method of designing an FSS filter may also be provided in a circuit or chipset including a memory and a computing element. FIG. 7 shows an example of a configuration of a device 400 on which the software for the method of designing an FSS filter is installed without any limitations on the physical configuration. FIG. 7 may be a configuration of a server, a chip, etc.

The device 400 on which the software for the method of designing an FSS filter is installed includes an input device 410, a computation device 420, and a storage device 430. In addition, the device 400 on which the software for the method of designing an FSS filter is installed may include an output device 440.

The input device 410 receives target frequency response data. The input device 410 may be a communication device or an interface device that receives measurement data from a network. Also, the input device 410 may be an interface device that receives measurement data through a wired network. Meanwhile, the input device 410 may receive an external control signal. For example, target frequency response data may be input by a user through the input device.

The storage device 430 may store a software model for the method of designing an FSS filter. The storage device 430 may be implemented as one of various media, such as a semiconductor storage device, a hard disk, etc., for storing data. The storage device 430 may store the software for the method of designing an FSS filter, various information and parameters used in a computation process, and the computation results.

The computation device 440 runs the software for the method of designing an FSS filter using the provided measurement data. Also, the computation device 440 may compute a frequency response of the FSS filter 10 on the basis of the computation results and derive a result value by inputting the provided target frequency response data to the software for the method of designing an FSS filter.

The computation device 440 corresponds to a device that processes data by running a certain instruction or program. The computation device 440 may be implemented as a memory (buffer) for temporarily storing an instruction or information and a processor for performing a computation process. The processor may be implemented as a central processing unit (CPU), an application processor (AP), a field programmable gate array (FPGA), etc. in accordance with the type of device.

The output device 440 may be a communication device that externally transmits necessary data. The output device 440 may externally transmit the result value derived by the trained software for the method of designing an FSS filter. In some cases, the output device may be a device that outputs a training process of the software for the method of designing an FSS filter or the result value derived by the trained software for the method of designing an FSS filter through a screen.

Also, the above-described method of designing an FSS filter may be implemented as a program (or an application) including a computer-executable algorithm. The program may be stored and provided in a non-transitory computer-readable medium.

The non-transitory computer-readable medium is not a medium that stores data for a short time period, such as a register, a cache, a memory, etc., but a medium that stores data semi-permanently and is readable by a device. Specifically, the above-described various applications or programs can be stored and provided in a non-transitory computer-readable medium such as a compact disc (CD), a digital versatile disc (DVD), a hard disk, a Blu-ray disc, a Universal Serial Bus (USB) device, a memory card, a read-only memory (ROM), etc.

Simulation Example

A simulation example will be described below with reference to the accompanying drawings. A computer program for performing the method of designing an FSS filter according to the present embodiment was written in the language Python. Frequency response characteristics of candidate solutions are calculated by a high-frequency electromagnetic solver (HFSS) which is an electromagnetic numerical analysis program. An optimization method computer program and the HFSS are merged in the computer program language Iron Python.

Figure 8:
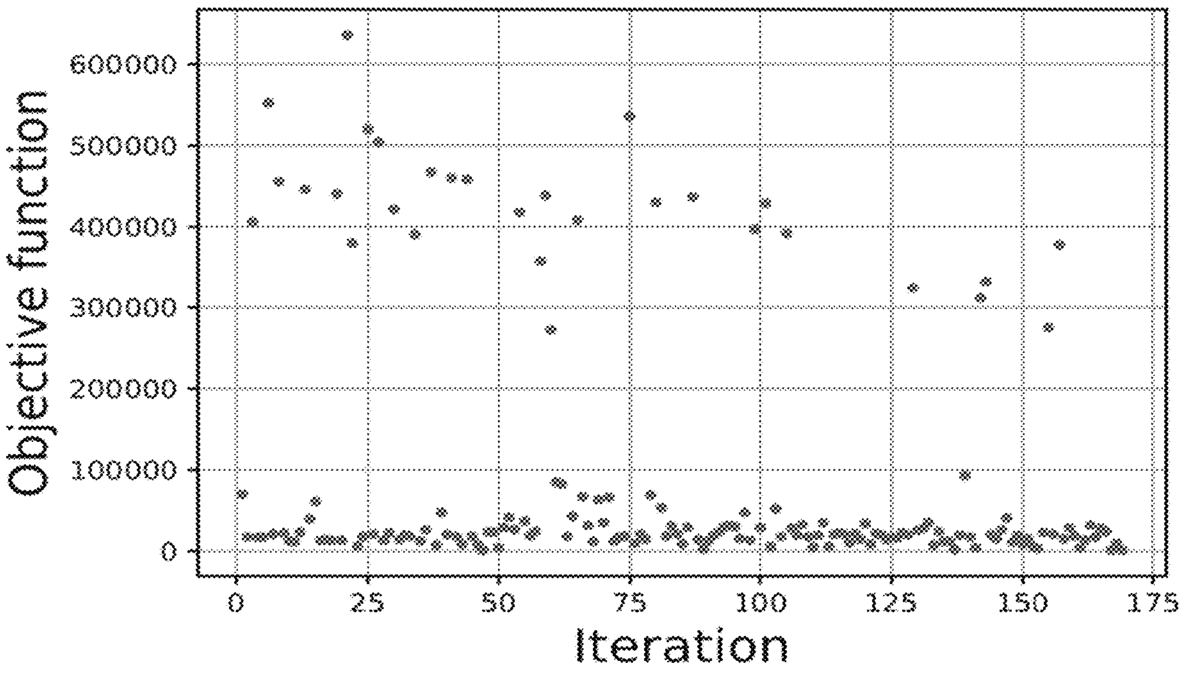
FIG. 8 is a graph showing a change of an objective-function value with respect to iteration.

FIG. 8 is a graph showing a change of an objective-function value with respect to the number of iterations of objective-function calculation. Referring to FIG. 8, when the number of iterations increases, an iteration function value exceeding 600,000 at the most is gradually reduced. Further, when the number of iterations becomes closer to 175, the objective-function value converges to 5,000 or less so that the frequency characteristic of the designed filter approaches a targeted frequency characteristic.

An FSS filter was designed to have a pixel size of 0.1 $mm^2$ and an overall size of 5.4 $mm^2$ including 54×54 unit cells using the method of designing an FSS filter according to the present embodiment.

Figure 9:
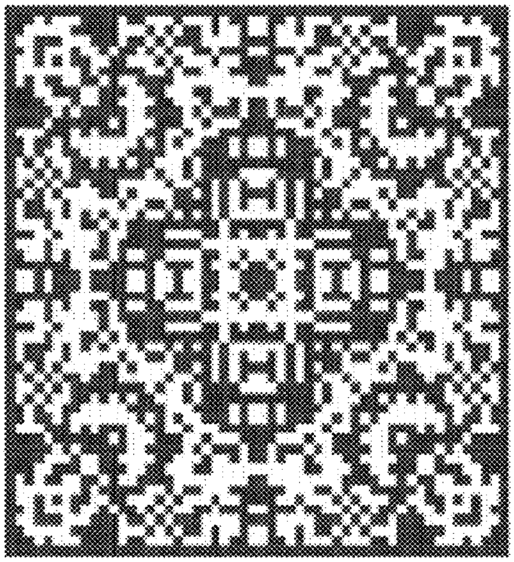
FIG. 9, (a) is a diagram showing an overview of a single FSS filter designed with the method of designing an FSS filter according to the present embodiment and FIG. 9, (b) is a graph showing a frequency response of the filter.
Figure 9:
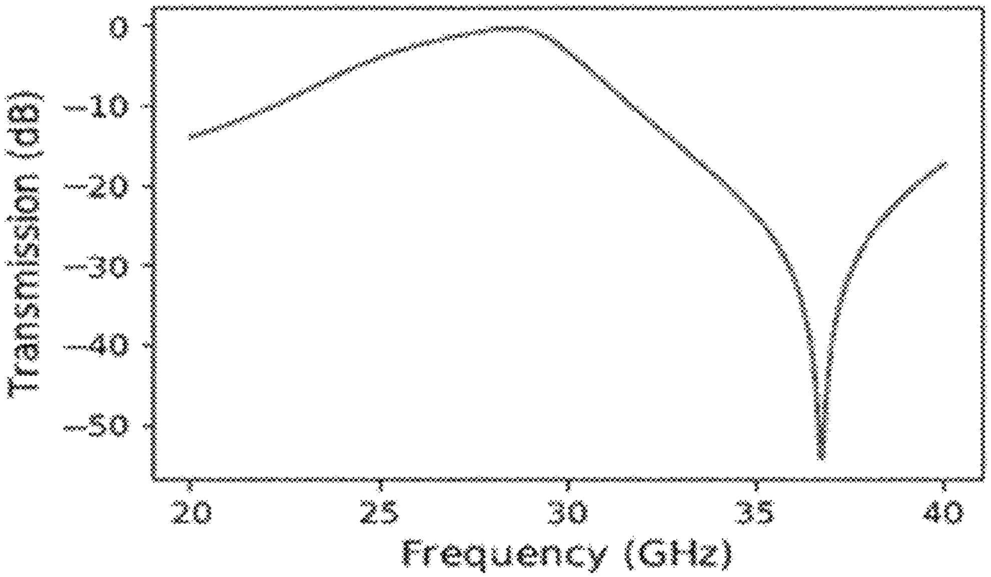

FIG. 9, (a) is a diagram showing a shape of an FSS filter according to the present embodiment. FIG. 9, (b) is a graph showing a frequency response characteristic calculated from an FSS filter shape obtained through an optimization process. This is close to a targeted wideband response characteristic that has a center frequency of 28.5 GHz and a passband from 28.35 GHz to 29.25 GHz (on the basis of a transmission loss of 1 dB or less).

Figure 10:
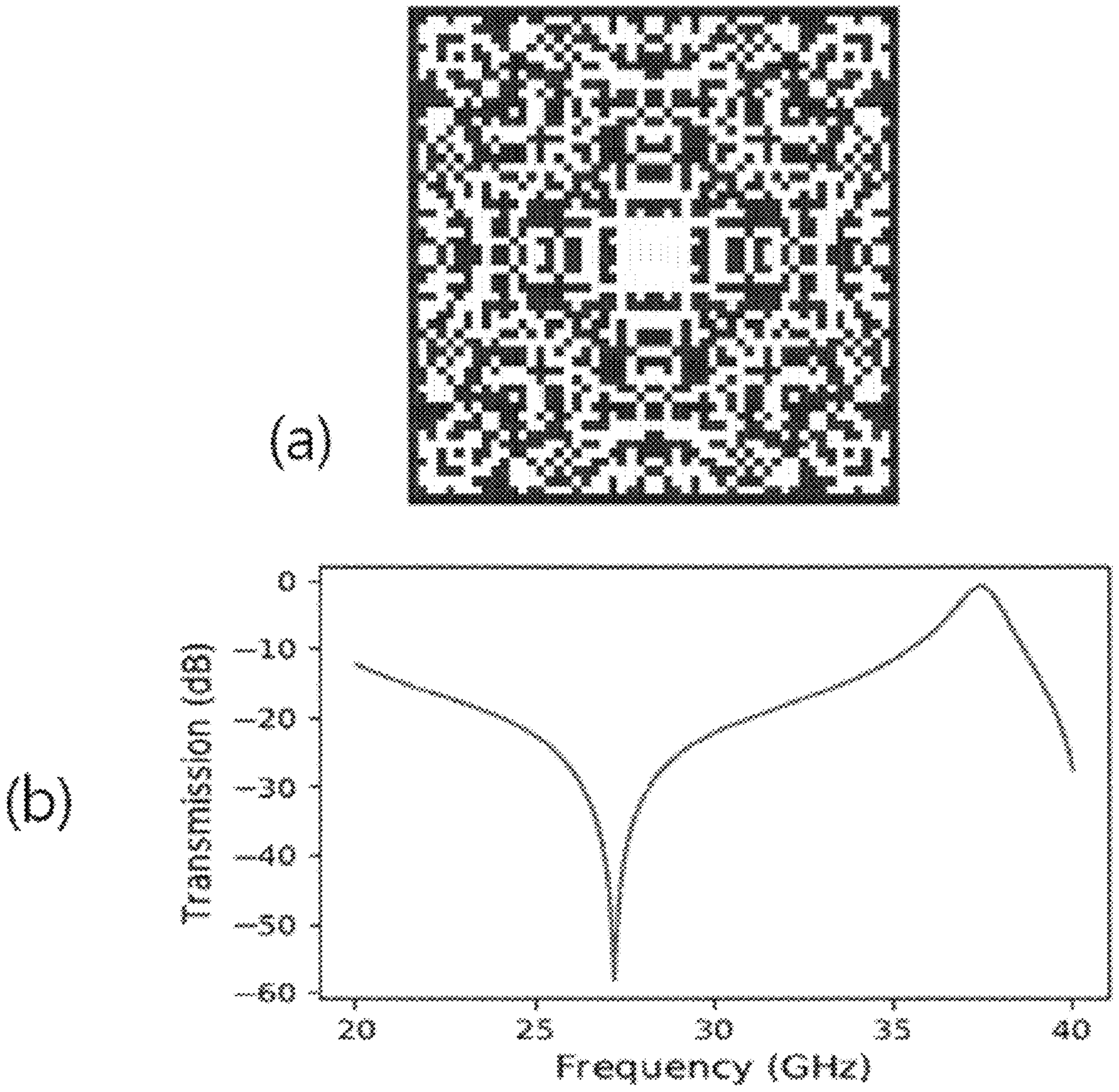
FIG. 10, (a) is a diagram showing an overview of an FSS filter designed with the method according to the present embodiment and FIG. 10, (b) is a graph showing a frequency response of the filter.

FIG. 10, (a) is a diagram showing a shape of an FSS filter according to the present embodiment. FIG. 10, (b) is a graph showing a frequency response characteristic calculated from an FSS filter shape obtained through an optimization process. This is close to a targeted narrowband response characteristic that has a center frequency of 37.5 GHz and a passband from 37.3 GHz to 37.55 GHz (on the basis of a transmission loss of 1 dB or less). The single FSS filters illustrated in FIGS. 9 and 10 are single band filters having a single passband.

Figure 11:
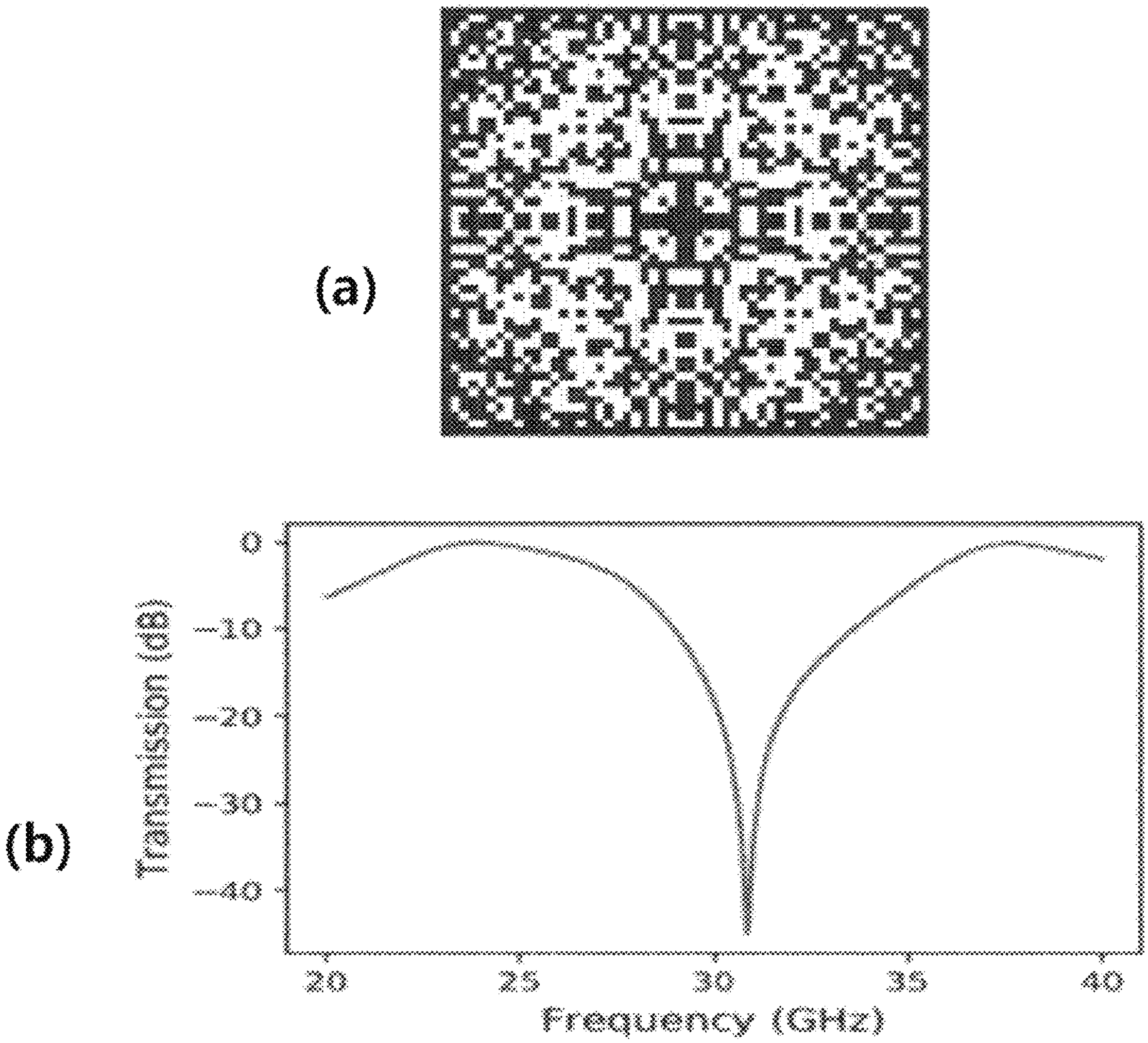
FIG. 11, (a) is a diagram showing an overview of an FSS filter designed with a method of designing a dual-band FSS filter according to the present embodiment and FIG. 11, (b) is a graph showing a frequency response of the filter.

FIG. 11, (a) is a diagram showing a shape of a dual-band FSS filter according to the present embodiment. FIG. 11, (b) is a graph showing a frequency response characteristic calculated from an FSS filter shape obtained through an optimization process. This is close to a targeted wideband response characteristic that has center frequencies of 24 GHz and 37.5 GHz and passbands from 22.7 GHz to 25.5 GHz and from 36.65 GHz to 39 GHz (on the basis of a transmission loss of 1 dB or less).

Figure 12:
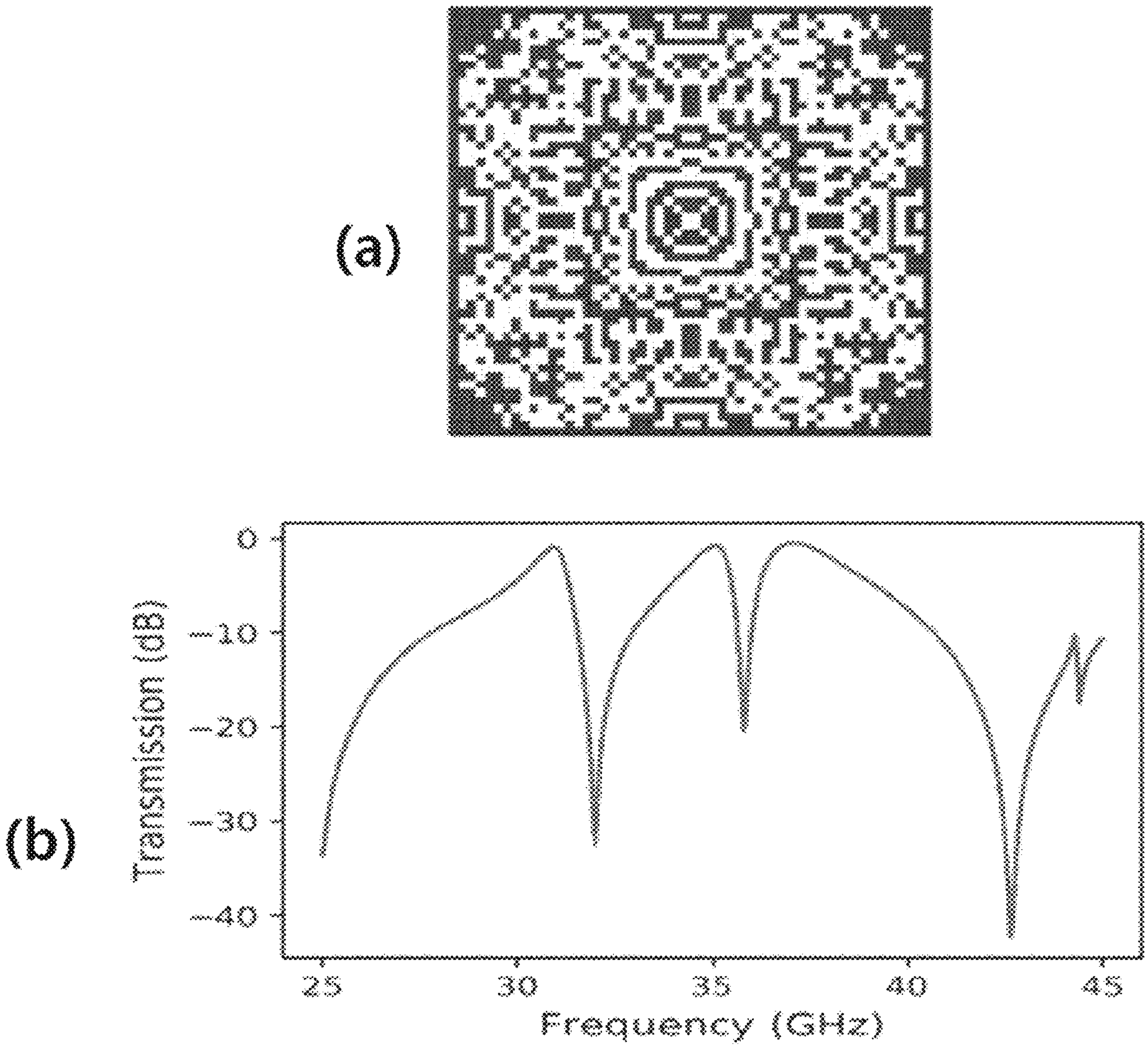
FIG. 12, (a) is a diagram showing an overview of an FSS filter designed with a method of designing a triple-band FSS filter according to the present embodiment and FIG. 12, (b) is a graph showing a frequency response of the filter.

FIG. 12, (a) is a diagram showing a shape of a triple-band FSS filter according to the present embodiment. FIG. 12, (b) is a graph showing a frequency response characteristic calculated from an FSS filter shape obtained through an optimization process. This is close to a targeted narrowband response characteristic that has center frequencies of 30.9 GHz, 35 GHz, and 37 GHz and passbands from 30.8 GHz to 31 GHz, from 34.8 GHz to 35.2 GHz, and from 36.7 GHz to 37.6 GHz (on the basis of a transmission loss of 1 dB or less).

Figure 13:
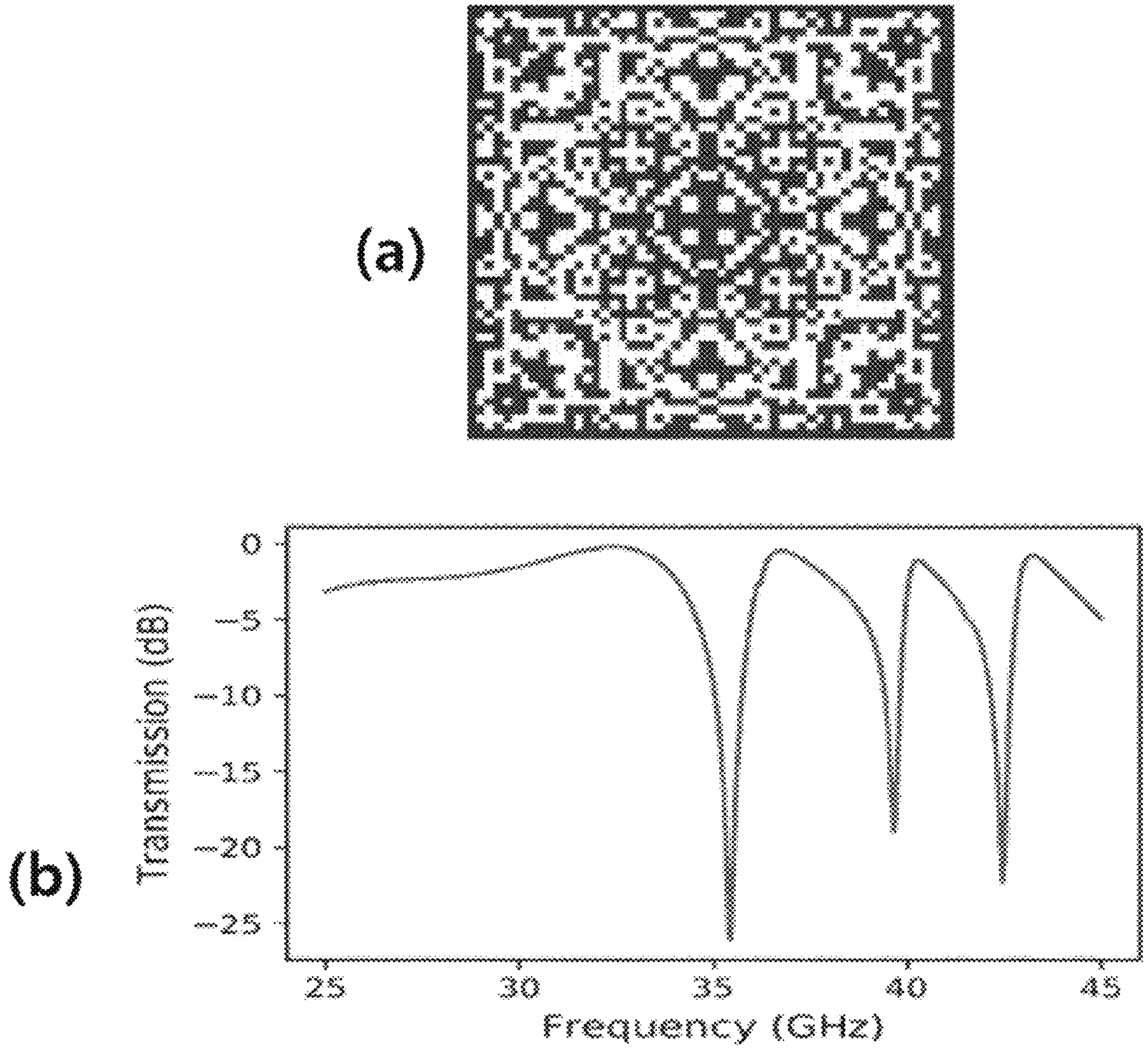
FIG. 13, (a) is a diagram showing an overview of an FSS filter designed with a method of designing a quadruple-band FSS filter according to the present embodiment and FIG. 13, (b) is a graph showing a frequency response of the filter.

FIG. 13, (a) is a diagram showing a shape of a quadruple-band FSS filter according to the present embodiment. FIG. 13, (b) is a graph showing a frequency response characteristic calculated from an FSS filter shape obtained through an optimization process. This is close to a targeted narrowband response characteristic that has center frequencies of 32.5 GHz, 36.7 GHz, 40.3 GHz, and 43.2 GHz and passbands from 30.8 GHz to 33.5 GHz, from 36.4 GHz to 37.3 GHz, from 40.2 GHz to 40.4 GHz, and from 43.1 GHz to 43.5 GHz (on the basis of a transmission loss of 1 dB or less).

The present embodiment is useful not only in designing single-band FSS filters as illustrated in FIGS. 9 and 10 but also in designing multi-band FSS filters as illustrated in FIGS. 11 to 13. In particular, according to the conventional art, designing a multi-band FSS filter is a process that takes a long time even when high-performance computing resources are used. However, according to the present embodiment, it is possible to easily design a multi-band FSS filter.

Figure 14:
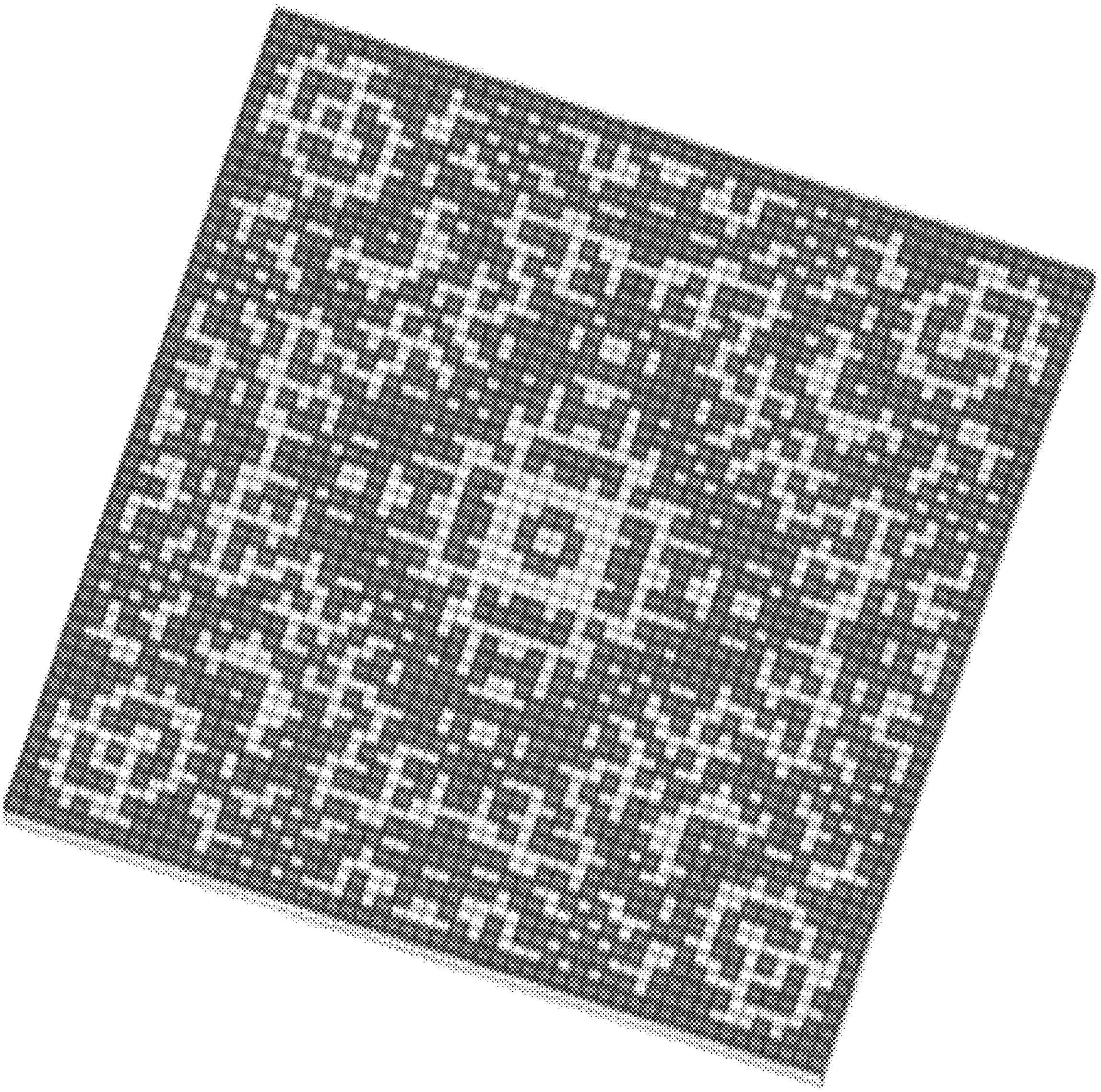
FIG. 14 is a diagram showing a shape of an FSS filter.

FIG. 14 is a diagram showing a shape of an FSS filter. The FSS filter includes pixels 120*b* (see FIG. 2, (b)) filled with a conductor, pixels 120*a* (see FIG. 2, (a)) not filled with a conductor, and a single dielectric layer 140 (see FIG. 2, (b)).

To facilitate understanding of the present invention, the present invention has been described with reference to embodiments shown in the drawings. However, these are embodiments for implementation and only exemplary. Those of ordinary skill in the art should understand that various modifications and equivalents can be made from the embodiments. Therefore, the true technical scope of the present invention should be determined by the appended claims.

The invention claimed is:

1. A method of designing and constructing a frequency selective surface (FSS) filter, the method comprising:

preparing a plurality of candidate solutions, each candidate solution being a binary sequence corresponding to an irreducible zone of the FSS filter, each digit of the binary sequence corresponding to a pixel of the irreducible zone that is either metal-filled or vacant, the irreducible zone being a minimum unit from which an entire surface of the FSS filter is reconstructed using rotational symmetry such that the FSS filter reconstructed from each candidate solution satisfies a rotational symmetry required for electromagnetic waves incident at various angles, calculating a respective candidate objective-function value for each candidate solution of the plurality of candidate solutions, each candidate objective-function value corresponding to a difference between a frequency response of the FSS filter resulting from the respective candidate solution and a targeted frequency response, wherein the frequency response of the FSS filter resulting from the respective candidate solution is calculated using a three-dimensional electromagnetic numerical simulation;

modifying a selected one of the plurality of candidate solutions into a trial solution in accordance with a genetic algorithm;

calculating a trial solution objective-function value with the trial solution to determine whether to include the trial solution in the plurality of candidate solutions;

outputting a structure of the FSS filter corresponding to a candidate solution among the plurality of candidate solutions having a smallest objective-function value; and arranging a plurality of unit FSS filters, each unit FSS filter having the output structure, in an array to constitute the FSS filter.

2. The method of claim 1, further comprising:

calculating distances between the plurality of candidate solutions; and setting a cutoff distance using the distances between the plurality of candidate solutions.

3. The method of claim 2, wherein the preparing of the plurality of candidate solutions comprises assigning a random number to a sequence corresponding to the irreducible zone of the FSS filter.

4. The method of claim 3, further comprising, after the preparing of the plurality of candidate solutions, inverting a value assigned to a part of a sequence of each of the plurality of prepared candidate solutions to perform local optimization.

5. The method of claim 3, wherein the calculating of the distances between the plurality of candidate solutions comprises calculating a Hamming distance of the sequence.

6. The method of claim 2, wherein the setting of the cutoff distance comprises setting the cutoff distance to half an average of the calculated distances between the plurality of candidate solutions.

7. The method of claim 1, wherein the calculating of the respective candidate objective-function value comprises:

calculating squares or absolute values of the difference between the targeted frequency response and the frequency response resulting from the candidate solution to remove signs; and summing calculation results from which the signs are removed.

8. The method of claim 1, wherein the genetic modifying of the selected one of the plurality of candidate solutions comprises performing mutation on the selected one of the plurality of candidate solutions or performing crossover on a plurality of candidate solutions.

9. The method of claim 8, wherein the performing of the mutation on the selected one of the plurality of candidate solutions comprises inverting a value assigned to at least a part of a sequence corresponding to the irreducible zone of the FSS filter.

10. The method of claim 9, wherein the performing of the crossover on the plurality of candidate solutions comprises replacing a value assigned to at least a part of a sequence of any one of the plurality of candidate solutions corresponding to the irreducible zone of the FSS filter with a value assigned to at least a part of a sequence of another one of the plurality of candidate solutions corresponding to the irreducible zone of the FSS filter.

11. The method of claim 1, wherein the genetic modifying of the selected one of the plurality of candidate solutions into the trial solution further comprises inverting a value assigned to a part of a sequence of the trial solution to perform local optimization.

12. The method of claim 2, wherein the determination of whether to include the trial solution in the plurality of candidate solutions comprises:

calculating distances between the trial solution and the plurality of candidate solutions to find a closest candidate solution which has a shortest distance from the trial solution;

when a distance between the trial solution and the closest candidate solution is smaller than the cutoff distance, comparing the calculated trial solution objective-function value with a closest objective-function value of the closest candidate solution; and when the trial solution objective-function value is larger than the closest objective-function value, discarding the trial solution, and when the trial solution objective-function value is smaller than the closest objective-function value, discarding the closest candidate solution and replacing the closest candidate solution with the trial solution.

13. The method of claim 2, wherein the determination of whether to include the trial solution in the plurality of candidate solutions comprises:

calculating distances between the trial solution and the plurality of candidate solutions to find a closest candidate solution which has a shortest distance from the trial solution;

when a distance between the trial solution and the closest candidate solution is larger than the cutoff distance, comparing the calculated trial solution objective-function value with a compared objective-function value of a candidate solution to be compared which is highest among the plurality of candidate solutions; and when the trial solution objective-function value is smaller than the compared objective-function value, discarding the candidate solution to be compared and replacing the candidate solution to be compared with the trial solution, and when the trial solution objective-function value is larger than the compared objective-function value, discarding the trial solution.

14. The method of claim 1, wherein one or more of a single-band FSS filter and a multi-band FSS filter are designed.

15. A non-transitory computer-readable storage medium having embodied thereon a program, which when executed by a computer causes the computer to execute a method of designing a frequency selective surface (FSS) filter, the method comprising:

preparing a plurality of candidate solutions, each candidate solution being a binary sequence corresponding to an irreducible zone of an FSS filter, each digit of the binary sequence corresponding to a pixel of the irreducible zone that is either metal-filled or vacant, the irreducible zone being a minimum unit from which an entire surface of the FSS filter is reconstructed using rotational symmetry such that the FSS filter reconstructed from each candidate solution satisfies a rotational symmetry required for electromagnetic waves incident at various angles, calculating a respective candidate objective-function value for each candidate solution of the plurality of candidate solutions, each candidate objective-function value corresponding to a difference between a frequency response of the FSS filter resulting from the respective candidate solution and a targeted frequency response, wherein the frequency response of the FSS filter resulting from the respective candidate solution is calculated using a three-dimensional electromagnetic numerical simulation;

modifying a selected one of the plurality of candidate solutions into a trial solution in accordance with a genetic algorithm;

calculating a trial solution objective-function value with the trial solution to determine whether to include the trial solution in the plurality of candidate solutions; and outputting a structure of the FSS filter corresponding to a candidate solution among the plurality of candidate solutions having a smallest objective-function value.

16. The non-transitory computer-readable storage medium of claim 15, wherein the method further comprises:

calculating distances between the plurality of candidate solutions; and setting a cutoff distance using the distances between the plurality of candidate solutions.

17. The non-transitory computer-readable storage medium of claim 16, wherein the preparing of the plurality of candidate solutions comprises assigning a random number to a sequence corresponding to the irreducible zone of the FSS filter.

18. The non-transitory computer-readable storage medium of claim 17, wherein the method further comprises, after the preparing of the plurality of candidate solutions, inverting a value assigned to a part of a sequence of each of the plurality of prepared candidate solutions to perform local optimization.

19. The non-transitory computer-readable storage medium of claim 17, wherein the calculating of the distances between the plurality of candidate solutions comprises calculating a Hamming distance of the sequence.

20. The non-transitory computer-readable storage medium of claim 16, wherein the setting of the cutoff distance comprises setting the cutoff distance to half an average of the calculated distances between the candidate solutions.

21. The non-transitory computer-readable storage medium of claim 15, wherein the calculating of the respective candidate objective-function value comprises:

calculating squares or absolute values of the difference between the targeted frequency response and the frequency response resulting from the candidate solution to remove signs; and summing calculation results from which the signs are removed.

22. The non-transitory computer-readable storage medium of claim 15, wherein the genetic modifying of the selected one of the plurality of candidate solutions comprises performing mutation on the selected one of the plurality of candidate solutions or performing crossover on a plurality of candidate solutions.

23. The non-transitory computer-readable storage medium of claim 22, wherein the performing of the mutation on the selected one of the plurality of candidate solutions comprises inverting a value assigned to at least a part of a sequence corresponding to the irreducible zone of the FSS filter.

24. The non-transitory computer-readable storage medium of claim 23, wherein the performing of the crossover on the plurality of candidate solutions comprises replacing a value assigned to at least a part of a sequence of any one of the plurality of candidate solutions corresponding to the irreducible zone of the FSS filter with a value assigned to at least a part of a sequence of another one of the plurality of candidate solutions corresponding to the irreducible zone of the FSS filter.

25. The non-transitory computer-readable storage medium of claim 15, wherein the genetic modifying of the selected one of the plurality of candidate solutions into the trial solution further comprises inverting a value assigned to a part of a sequence of the trial solution to perform local optimization.

26. The non-transitory computer-readable storage medium of claim 16, wherein the determination of whether to include the trial solution in the plurality of candidate solutions comprises:

calculating distances between the trial solution and the plurality of candidate solutions to find a closest candidate solution which has a shortest distance from the trial solution;

when a distance between the trial solution and the closest candidate solution is smaller than the cutoff distance, comparing the calculated trial solution objective-function value with a closest objective-function value of the closest candidate solution; and when the trial solution objective-function value is larger than the closest objective-function value, discarding the trial solution, and when the trial solution objective-function value is smaller than the closest objective-function value, discarding the closest candidate solution and replacing the closest candidate solution with the trial solution.

27. The non-transitory computer-readable storage medium of claim 16, wherein the determination of whether to include the trial solution in the plurality of candidate solutions comprises:

calculating distances between the trial solution and the plurality of candidate solutions to find a closest candidate solution which has a shortest distance from the trial solution;

when a distance between the trial solution and the closest candidate solution is larger than the cutoff distance, comparing the calculated trial solution objective-function value with a compared objective-function value of a candidate solution to be compared which is highest among the candidate solutions; and when the trial solution objective-function value is smaller than the compared objective-function value, discarding the candidate solution to be compared and replacing the candidate solution to be compared with the trial solution, and when the trial solution objective-function value is larger than the compared objective-function value, discarding the trial solution.

28. The non-transitory computer-readable storage medium of claim 15, wherein one or more of a single-band FSS filter and a multi-band FSS filter are designed according to the method.

29. A frequency selective surface (FSS) filter designed according to the method of claim 1.

* * * * *